United States Patent
Malatesha et al.

(10) Patent No.: US 10,606,554 B2
(45) Date of Patent: *Mar. 31, 2020

(54) VOICE CONTROL OF INTERACTIVE WHITEBOARD APPLIANCES

(71) Applicant: RICOH COMPANY, LTD., Tokyo (JP)

(72) Inventors: Rathnakara Malatesha, Sunnyvale, CA (US); Lana Wong, Belleville, NJ (US); Hiroshi Kitada, Tuckahoe, NY (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,963

(22) Filed: Aug. 21, 2019

(65) Prior Publication Data
US 2019/0377546 A1  Dec. 12, 2019

Related U.S. Application Data

(63) Continuation of application No. 15/061,806, filed on Mar. 4, 2016, now Pat. No. 10,409,550.

(51) Int. Cl.
*G06F 3/16* (2006.01)
*G06F 3/0354* (2013.01)
(Continued)

(52) U.S. Cl.
CPC .......... *G06F 3/167* (2013.01); *G06F 3/03545* (2013.01); *G06F 3/041* (2013.01);
(Continued)

(58) Field of Classification Search
None
See application file for complete search history.

(56) References Cited

U.S. PATENT DOCUMENTS 8,554,559 B1 * 10/2013 Aleksic .................. G10L 15/30
704/235
8,723,791 B2 * 5/2014 Kalaldeh ............... G06F 3/0317
235/494

(Continued)

*Primary Examiner* — Thuykhanh Le
(74) *Attorney, Agent, or Firm* — Hickman Palermo Becker Bingham LLP; Edward A. Becker

(57) ABSTRACT

A method and apparatus for providing voice command functionality to an interactive whiteboard appliance is provided. An interactive whiteboard appliance comprises: one or more processors; a non-transitory computer-readable medium having instructions embodied thereon, the instructions when executed by the one or more processors cause performance of: detecting, during execution of an annotation window on the interactive whiteboard appliance, a voice input received from a user; storing, in an audio packet, a recording of the voice input; transmitting the audio packet to a speech-to-text service; receiving, from the speech-to-text service, a command string comprising a transcription of the recording of the voice input; using voice mode command processing in a command processor, identifying, from the command string, an executable command that is executable by the interactive whiteboard appliance; causing the application of the interactive whiteboard appliance to execute the executable command.

20 Claims, 5 Drawing Sheets

(51) Int. Cl.
*G06F 3/041* (2006.01)
*G10L 15/26* (2006.01)
*G10L 15/30* (2013.01)
*G10L 15/22* (2006.01)

(52) U.S. Cl.
CPC .............. *G10L 15/22* (2013.01); *G10L 15/26* (2013.01); *G10L 15/30* (2013.01); *G06F 2203/0381* (2013.01); *G10L 2015/223* (2013.01)

(56) References Cited

U.S. PATENT DOCUMENTS

| | | | | |
|---|---|---|---|---|
| 9,070,367 | B1* | 6/2015 | Hoffmeister | G10L 15/187 |
| 9,210,200 | B1* | 12/2015 | Chapweske | H04L 65/4038 |
| 9,368,114 | B2* | 6/2016 | Larson | H04M 1/72522 |
| 2003/0234772 | A1* | 12/2003 | Zhang | G06Q 10/1095 |
| | | | | 345/177 |
| 2008/0222142 | A1* | 9/2008 | O'Donnell | G06F 16/24575 |
| 2009/0271848 | A1* | 10/2009 | Leung | H04L 65/4015 |
| | | | | 726/6 |
| 2009/0282103 | A1* | 11/2009 | Thakkar | H04N 7/147 |
| | | | | 709/204 |
| 2010/0145729 | A1* | 6/2010 | Katz | G06Q 10/06315 |
| | | | | 705/3 |
| 2010/0235854 | A1* | 9/2010 | Badgett | G09B 7/00 |
| | | | | 725/24 |
| 2010/0250243 | A1* | 9/2010 | Schalk | G10L 15/22 |
| | | | | 704/201 |
| 2011/0237301 | A1* | 9/2011 | Patel | G06Q 20/32 |
| | | | | 455/566 |
| 2012/0069131 | A1* | 3/2012 | Abelow | G06Q 10/067 |
| | | | | 348/14.01 |
| 2012/0260177 | A1* | 10/2012 | Sehrer | G06F 3/167 |
| | | | | 715/727 |
| 2012/0262296 | A1* | 10/2012 | Bezar | G10L 17/26 |
| | | | | 340/573.1 |
| 2012/0321062 | A1* | 12/2012 | Fitzsimmons | H04L 65/4015 |
| | | | | 379/142.17 |
| 2013/0063537 | A1* | 3/2013 | Emori | H04N 7/147 |
| | | | | 348/14.01 |
| 2013/0096919 | A1* | 4/2013 | Klassen | G06F 3/0237 |
| | | | | 704/257 |
| 2013/0275317 | A1* | 10/2013 | West | G06Q 30/018 |
| | | | | 705/317 |
| 2013/0282381 | A1* | 10/2013 | Mauro | G10L 15/26 |
| | | | | 704/275 |
| 2014/0006022 | A1* | 1/2014 | Yoon | H04N 21/234336 |
| | | | | 704/235 |
| 2014/0149165 | A1* | 5/2014 | Husby | G06Q 10/1095 |
| | | | | 705/7.19 |
| 2014/0298178 | A1* | 10/2014 | Kilgour | G06F 3/0484 |
| | | | | 715/730 |
| 2014/0333531 | A1* | 11/2014 | Phang | G06F 3/017 |
| | | | | 345/156 |
| 2015/0015504 | A1* | 1/2015 | Lee | G06F 3/04845 |
| | | | | 345/173 |
| 2015/0085058 | A1* | 3/2015 | Zhang | H04N 7/142 |
| | | | | 348/14.02 |
| 2015/0169069 | A1* | 6/2015 | Lo | G06F 3/017 |
| | | | | 715/753 |
| 2015/0248534 | A1* | 9/2015 | Krzywicki | G06F 3/04847 |
| | | | | 715/771 |
| 2015/0261496 | A1* | 9/2015 | Faaborg | G06F 3/167 |
| | | | | 715/728 |
| 2015/0269857 | A1* | 9/2015 | Feng | G09B 7/00 |
| | | | | 434/353 |
| 2015/0339104 | A1* | 11/2015 | Frenkiel | G06F 8/20 |
| | | | | 717/113 |
| 2015/0347204 | A1* | 12/2015 | Stanley-Marbell | G06F 9/542 |
| | | | | 719/318 |
| 2016/0034253 | A1* | 2/2016 | Bang | G06F 9/5044 |
| | | | | 715/728 |
| 2016/0048368 | A1* | 2/2016 | McGibney | G06F 3/1454 |
| | | | | 345/2.3 |
| 2016/0071486 | A1* | 3/2016 | Byers | H04N 9/3147 |
| | | | | 345/690 |
| 2016/0182579 | A1* | 6/2016 | Tsang | H04L 65/4023 |
| | | | | 709/204 |
| 2016/0292897 | A1* | 10/2016 | Gabor | G06F 3/165 |
| 2016/0330404 | A1* | 11/2016 | Nelson | H04N 7/15 |
| 2016/0337416 | A1* | 11/2016 | Galbraith | G06F 3/0421 |
| 2017/0017861 | A1* | 1/2017 | Patil | H04N 21/466 |
| 2017/0018282 | A1* | 1/2017 | Tsai | G10L 25/78 |
| 2017/0019402 | A1* | 1/2017 | Kulkarni | H04L 63/0807 |
| 2017/0085940 | A1* | 3/2017 | Innes | H04N 21/42623 |
| 2017/0256260 | A1* | 9/2017 | Jeong | G06F 3/16 |

* cited by examiner

VOICE CONTROL OF INTERACTIVE WHITEBOARD APPLIANCES

RELATED APPLICATION DATA AND CLAIM OF PRIORITY

This application is a Continuation of prior U.S. patent application Ser. No. 15/061,806 entitled "VOICE CONTROL OF INTERACTIVE WHITEBOARD APPLIANCES", filed Mar. 4, 2016, the contents of which are incorporated by reference for all purposes as if fully set forth herein.

TECHNICAL FIELD

The disclosure relates generally to teleconferencing technologies and more specifically to providing teleconferencing abilities via interactive whiteboard appliances.

BACKGROUND

Teleconferencing technologies can be awkward and cumbersome to control. The difficulty may result in user being unable or unwilling to exploit the available features of the teleconferencing technology. The user may, for example, have to learn to navigate complex menus or memorize icons corresponding to common commands. Further, while expert users have had time to learn the available features, novice users may flounder or visibly hesitate when using a new feature when presenting to other users, reducing the credibility of the novice user.

Many electronic devices can be controlled using an input device like a keyboard, a mouse, or a touchscreen that the user controls using his hand. Voice recognition technologies provide a way for users to interact with an electronic device using voice, resulting in a hands-free user experience. Some smartphones, like the IPHONE® produced by Apple Computers of Cupertino, Calif., or ANDROID® devices that run on the ANDROID® operating system published by Alphabet, Inc. of Mountain View, Calif., include a voice controlled application that interacts with compatible applications on the device to cause the device to respond to voice commands.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An interactive whiteboard appliance comprises: one or more processors; a non-transitory computer-readable medium having instructions embodied thereon, the instructions when executed by the one or more processors cause performance of: detecting, during execution of an annotation window on the interactive whiteboard appliance, a voice input received from a user; storing, in an audio packet, a recording of the voice input; transmitting the audio packet to a speech-to-text service; receiving, from the speech-to-text service, a command string comprising a transcription of the recording of the voice input; using voice mode command processing in a command processor, identifying, from the command string, an executable command that is executable by the interactive whiteboard appliance; causing the application of the interactive whiteboard appliance to execute the executable command.

In some instances, in the interactive whiteboard appliance, the instructions, when executed, further cause performance of: detecting, during execution of the annotation window on an interactive whiteboard appliance, a stylus input from a user in the annotation window; using pen mode command processing in the command processor, identifying, from the stylus input, an additional command; causing the application of the interactive whiteboard appliance to execute the additional command.

In some instances, in the interactive whiteboard appliance, detecting the voice input comprises: operating a microphone in a continuous listening mode that captures a continuous audio feed; capturing the voice input from the continuous audio feed. In some instances, in the interactive whiteboard appliance, detecting the voice input comprises: operating a microphone in a start command mode; detecting a start command; in response to detecting the start command, capturing the voice input from a subsequent audio feed.

In some instances, in the interactive whiteboard appliance, receiving, from the speech-to-text service, the command string comprises: using a client device associated with the interactive whiteboard appliance, detecting, during execution of an application on the client device associated with the interactive whiteboard appliance, a second voice input from a second user; using the client device, storing, in a second audio packet, a recording of the second voice input; using the client device, transmitting the second audio packet to a speech-to-text service; wherein the instructions, when executed, further cause performance of: at the interactive whiteboard appliance, receiving, from the speech-to-text service, a command string comprising a transcription of the recording of the second voice input; at the interactive whiteboard appliance, using voice mode command processing in the command processor, identifying, from the transcription of the recording of the second voice input, a second executable command; at the interactive whiteboard appliance, causing the application of the interactive whiteboard appliance to execute the second executable command.

In some instances, in the interactive whiteboard appliance, the client device is associated with the interactive whiteboard appliance using a selection of the interactive whiteboard appliance received from the user via the application on the mobile device.

In some instances, in the interactive whiteboard appliance, the client device comprises a mobile device.

In some instances, in the interactive whiteboard appliance, the client device comprises another interactive whiteboard appliance.

In some instances, in the interactive whiteboard appliance, the audio packet includes an identifier of the interactive whiteboard appliance that identifies the interactive whiteboard appliance from a plurality of interactive whiteboard appliances.

In some instances, in the interactive whiteboard appliance, transmitting the audio packet to the speech-to-text service comprises: transmitting the audio packet via an audio packet queue that stores a plurality of queued audio packets transmitted by the plurality of interactive whiteboard appliances.

In some instances, in the interactive whiteboard appliance, receiving, from the speech-to-text service, the command string comprises: receiving the command string via a command string queue stores a plurality of queued command strings to be sent to the plurality of interactive whiteboard appliances; determining that the identifier of the interactive whiteboard appliance included in the audio packet matches the identifier of the interactive whiteboard appliance.

In some instances, in the interactive whiteboard appliance, identifying, from the transcription of the recording of the voice input, the executable command comprises: modifying the transcription of the recording by adding or removing one or more characters from the transcription resulting in a modified transcription; matching the modified transcription to an executable command.

In some instances, in the interactive whiteboard appliance, causing the application of the interactive whiteboard appliance to execute the executable command comprises: communicating the executable command to an operating system of the interactive whiteboard appliance via an application programming interface (API).

In some instances, in the interactive whiteboard appliance, the speech-to-text service is implemented on the interactive whiteboard appliance.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An interactive whiteboard appliance has a voice control capabilities. The voice control capabilities allow the user of the interactive whiteboard appliance to control the interactive whiteboard appliance using a plurality of voice commands. The voice commands provides hands-free operation of the interactive whiteboard appliance. Further, the voice control capability allows the user to more intuitively control the interactive whiteboard appliance without requiring that the user have prior knowledge of menu flows or interactive icons included in a display. The voice control capability allows the interactive whiteboard appliance to provide a relatively simple graphical user interface while providing enhanced functionality where the enhanced functionality is largely supported by off-device computing resources. This reduces the computational load on the interactive whiteboard appliance. Further, the use of voice commands reduces user error in navigating the graphical user interface, eliminating consumption of the computational resources expended in providing unwanted menus, help functionality, and icons to the user.

At the interactive whiteboard (IWB) appliance, via a micro phone, a user provides a voice command. A voice recognition processor of the interactive whiteboard appliance captures a recording of the voice command. The voice recognition processor packages the recording and metadata including an identifier of the interactive whiteboard appliance into an audio packet and sends the audio packet to an audio queue manager. The audio queue manager queues the audio packet in an audio queue and, as appropriate, sends the audio packet to a speech-to-text service. The speech-to-text service transcribes the recording, resulting in a transcription. The speech-to-text service sends the transcription and metadata as a command string to a command string queue manager. The command string queue manager queues the command string and, as appropriate, sends the command string to a command processor in the IWB appliance. The command processor identifies an executable command in the transcription and causes the IWB appliance to execute the executable command string by calling the API on the IWB appliance.

Networked Environment

Figure 1:
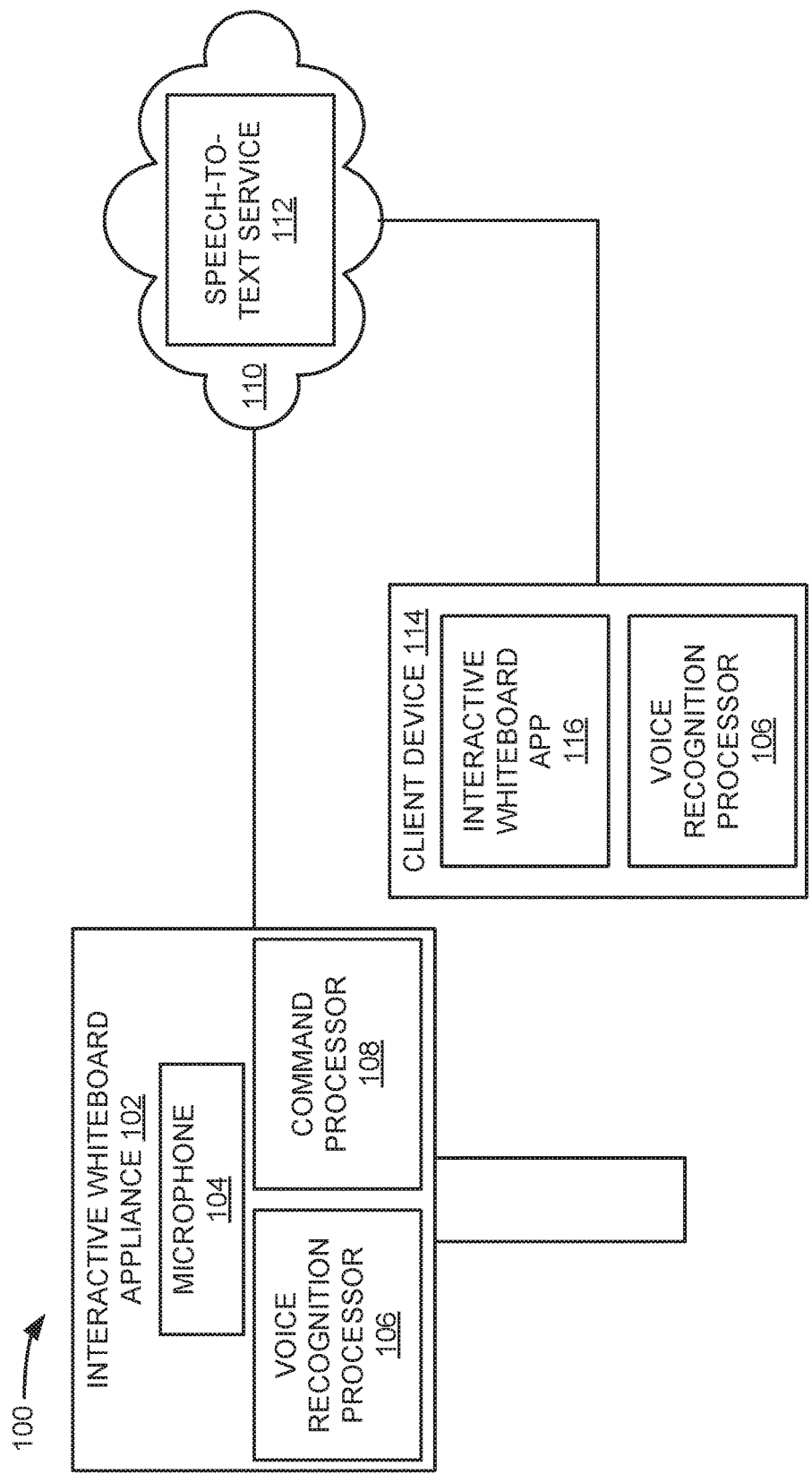
FIG. 1 depicts a networked environment in which various embodiments may be practiced.

FIG. 1 depicts a networked environment 100 in which various embodiments may be practiced. The networked environment 100 comprises two or more computing devices that are configured to communicate with one another via an electronic network, such as a Local Area Network (LAN), a Wide Area Network (WAN), or the Internet. In some instances, some of the computing devices may communicate via a LAN while others may communicate via a WAN or the Internet. The networked environment 100 allows an IWB appliance to access additional functionality of a speech-to-text service without requiring substantial changes to the IWB appliance itself.

The IWB appliance 102 is configured to communicate, via a network, with a remote speech-to-text service 108. The IWB appliance 102 is a collaboration and conferencing device that provides communication and annotation capabilities in real-time for a plurality of users. Some features of the IWB appliance 102 include, but are not limited to: annotation of documents; sharing of files; real-time annotation across multiple IWB appliances (not depicted), mobile apps, and third party solutions; sharing and syncing of data with cloud-based services; optical character recognition; and localization capabilities. The IWB appliance 102 may be controlled by a user via a stylus or a touchscreen. The IWB appliance 102 includes a computing devices infrastructure such as networking capabilities, an operating system, a web browser, and can execute dedicated applications from third parties. The IWB appliance 102 further includes IWB appliance-specific applications for retrieving and opening documents, annotating documents, real-time sharing of documents and annotations, video conferencing, teleconferencing, and saving documents.

The IWB appliance 102 comprises a microphone 104 that captures sounds in the immediate vicinity of the IWB appliance 102. The microphone 104 may be an internal microphone built into the IWB appliance 102. In some instances, the microphone 104 may comprise one or microphones positioned in the immediate vicinity of the IWB appliance 102 and connected to the IWB appliance 102 via wired or wireless technologies. Examples of wired microphones include microphones that plug into the IWB appliance 102 via an audio jack or USB port of the IWB appliance 102. Examples of wireless microphones include Bluetooth-enabled microphones that communicate with a Bluetooth-enabled IWB appliance 102 via a Bluetooth link.

A voice recognition processor 106 in communication with the microphone 104 identifies a portion of the captured sounds as a potential voice command. The voice recognition processor 106 may comprise a voice recognition program included in the operating system of the IWB appliance 102, such as WINDOWS SPEECH RECOGNITION speech recognition component developed by Microsoft of Redmond, Wash. Alternatively, the voice recognition processor 106 may be an application executing on IWB appliance 102.

The voice recognition processor 106 may operate in one of two modes at a given time and may switch between modes at any time. The first mode, a continuous listening mode, involves constantly capturing sounds and analyzing the sounds to identify a potential voice command. In continuous listening mode, the voice recognition processor 106 detects potential voice commands by identifying an extended pause in sound lasting a threshold duration. The threshold duration may be, for example, less than one second, one second, or more than one second. Upon detecting the threshold duration, the voice recognition processor 106 may analyze a segment of sound captured previous to the pause and save a recording of sounds occurring just before the pause. The recording may include sounds captured during a specified time period before the pause, such as ten seconds, five seconds, or three seconds. In other embodiments, the voice recognition processor 106 may be configured to perform an initial voice recognition analysis on the segment to identify a potential command. The sounds captured during the period of time while the potential command was spoken are then saved as a recording.

The second mode of the voice recognition processor 106 is a start command mode. In the start command mode, the voice recognition software 106 detects potential voice commands by identifying, in the sounds captured by the microphone, a start command spoken by a user. The start command may be, for example, "Hey Bob!" where "Bob" is a nickname of the voice recognition processor 106. When the start command is detected, the voice recognition processor 106 begins to save a recording of the sounds occurring subsequently or after the start command was spoken. The recording may continue for a period of time such as 3 seconds, 5 seconds, or 10 seconds. In other embodiments, the voice recognition processor 106 may be configured to perform an initial voice recognition analysis on the segment of captured sounds to identify a potential command. The sounds captured during the period of time while the potential command was spoken are then saved as a recording.

The voice recognition processor 106 assembles the recording into an audio packet. The content and structure of the audio packet is not limited to any particular data structure or format, such as a networking packet, and instead is used generally to refer to data that includes both audio data and metadata. The audio packet includes additional metadata such as, but not limited to, an identifier of the IWB appliance 102 that recorded the recording and an identifier of an IWB appliance 102 that is intended to execute a command identified from the recording. In some instances, these identifiers may identify the same IWB appliance 102 but in other instances these may identify different IWB appliances 102. The metadata may further include an identifier of audio packet queue manager (see FIG. 2), and identifier of a speech-to-text service 110, and an identifier of a command string queue manager (see FIG. 2). The identifiers included in the metadata may include Internet Protocol (IP) addresses and/or Ports associated with each of the entities identified by the metadata. The voice recognition processor 106, having assembled the audio packet, sends the audio packet to the speech-to-text service 112.

The command processor 108 of the IWB appliance 102 receives a command string from the speech-to-text service 112, identifies a command from a transcription of the recording stored by the voice recognition processor 106, and causes the IWB appliance 102 to execute the command. The command processor 108 may modify the transcribed command string to identify the command by adding or removing one or more characters so that the transcription matches a stored command. This is to ensure that large variation of voice input and users are handled well on whiteboard and also to correct the speech-to-text transcriptions from errors to intended commands. Non-limiting examples of stored commands and their descriptions are included in Table 1:

TABLE 1

| Command | Description |
| --- | --- |
| Add Page | Adds a new page to whiteboard |
| Delete Page | Deletes current page from whiteboard |
| Copy Page | Copies and duplicates the current page |
| Save | Save pdf file to local drive |
| Import | Import last saved pdf from local drive |
| Save Box | Opens Box Authentication for Saving to Box [If token is expired] |
| Import Box | Opens Box Authentication for Import from Box [If token is expired] |
| Save Google Drive | Opens Drive Authentication for Saving [If token is expired] |
| Import Google Drive | Opens Drive Authentication for Import [If token is expired] |
| Print | Opens print preferences dialog |
| Font <color> | Changes font to spoken <color>, e.g Font Red will change pen color to Red |
| Open Chrome | Open google chrome |
| Open Prompt | Open command prompt |
| Open Keypad | Onscreen keypad |
| Start Meeting | Open whiteboard remote meeting dialog, needs IP and Port as input |
| Join Meeting | Open Join remote meeting dialog, needs IP and Port as input |
| Close Meeting | Close the ongoing meeting |
| Select | Select the annotation on whiteboard |
| Select All | Select all annotation on whiteboard |
| Erase All | Erase all annotation on whiteboard |
| Undo | Undo last annotation |
| Redo | Redo last Undo changes |
| Zoom | Opens Zoom panel |
| Start Lync | Start Lync process |

TABLE 1-continued

| Command | Description |
| --- | --- |
| Start Hangout | Start Google hangout |
| Stop Lync | Stop Lync process |
| Stop Hangout | Stop Google hangout |
| Close <IWB appliance> | Close whiteboard, Close <IWB appliance> or Close <Whiteboard> |
| Recognize <Language> | OCR capabilities to recognize language spoken |

The command processor, upon identifying an executable command from the transcription causes the operating system or an application executing on the operating system to perform an action corresponding to the command.

An optional cloud 110 of FIG. 1 hosts a speech-to-text service 112. The cloud 110 is a networked set of computing devices that provide services in a cloud environment. The speech-to-text service 112 may alternatively be hosted by a traditional online service provider outside of a cloud environment. In alternative embodiments, the speech-to-text service 112 may be hosted on-premise within a firewall. In other alternative embodiments, the speech-to-text service 112 may be an independent process running in an IWB appliance 102 and handling commands for only the one IWB appliance 102. These alternative embodiments may provide more security and privacy of the speech-to-text service 112.

The speech-to-text service 112 may be a third party provider of automated transcriptions of audio packets. Examples of such providers include, but are not limited to, WATSON® by International Business Machines of Armonk, N.Y. and DRAGON® speech recognition by Nuance Enterprise of Burlington, Mass.

A client device 114 may include a mobile computing device of a user or another IWB appliance. The client device 114 includes an interactive whiteboard app 116. The interactive whiteboard app 116 is a dedicated application for interacting with the IWB appliance 102. The interactive whiteboard app 116 provides a user interface that allows a user to establish an association between the client device 114 and the IWB appliance 102 and the interactive whiteboard app 116. The association is used by the voice recognition processor 106 on the client device 114 to send a command to the IWB appliance 102 to execute a command initiated at the client device 114. The interactive whiteboard app 116 may allow the user to select the IWB appliance 102 from a plurality of IWB appliances. For example, the interactive whiteboard app 116 may provide a graphical user interface that allows a user of client device 114 to select a particular IWB appliance, or a group of IWB appliances, to command remotely via client device 114. The voice recognition processor 106 on client device 114 may perform the same functionality described herein with respect to the voice recognition processor 106 on IWB appliance 102.

The client device 114 further comprises a voice recognition processor 106, which is described above. The voice recognition processor 106 receives sound input via a microphone connected to, or integrated with, the client device 114 as described in connection with the microphone 104. Using a client having a mobile app, the user need not be in front of whiteboard to speak the commands and cause the IWB appliance 102 to execute the commands. The user may control the IWB appliance 102 remotely. Controlling an IWB appliance 102 may be valuable in situations where multiple IWB appliances 102 may be controlled remotely by remote participants.

Figure 2:
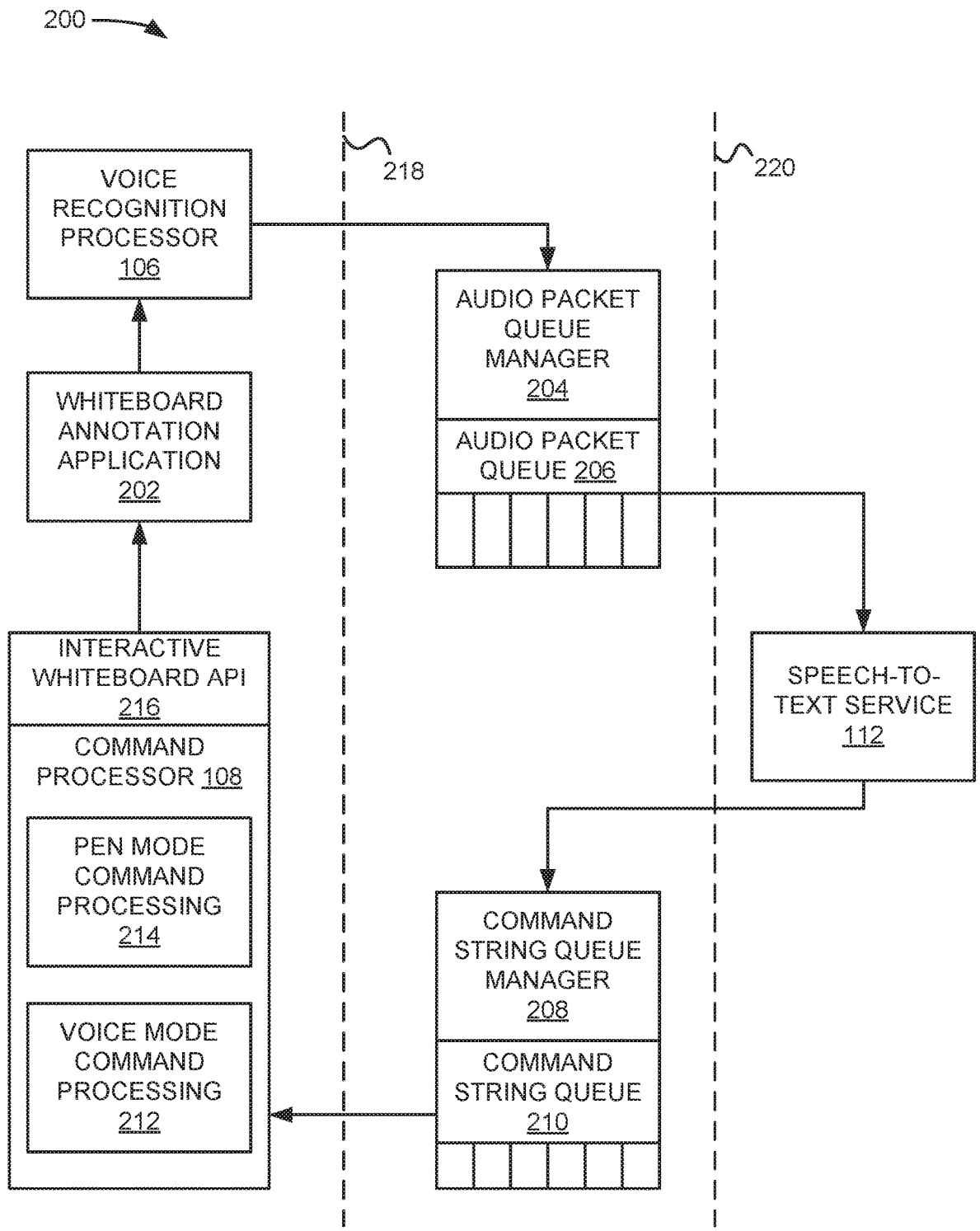
FIG. 2 depicts a system for providing voice control of an interactive whiteboard appliance according to some embodiments.

FIG. 2 depicts a system 200 for providing voice control of an interactive whiteboard appliance according to some embodiments. The system 200 provides a more nuanced view of the networked environment 100. The system 200 may be located in a single location, such as being entirely within the IWB appliance 102 or may be implemented across multiple locations and including multiple IWB appliances 102. For example, the portion of system 200 depicted to the left of the dotted line 218 (including the voice recognition processor 106, a whiteboard annotation application 202, an interactive whiteboard API 216, and the command processor 108) may be part of the IWB appliance 102 itself. The portion of the system 200 depicted between the dotted line 218 and the dotted line 220 (including an audio packet queue manager 204, an audio packet queue 206, a command string queue manager 208, and a command string queue 210) may be located on an entity-wide LAN, or in a cloud environment. The portion of the system 200 depicted to the right of the dotted line 220 (including the speech-to-text service 112) may be located in a cloud environment or on a third party server. Thus, embodiments are applicable to single location, multiple location and cloud-based implementations.

A whiteboard annotation application 202 is an application executed by the IWB appliance 102 that provides an annotation window that includes an electronic drawing surface on which a user may draw using a stylus or finger to create, open, annotate, and save electronic documents in real-time. For example, a user may view and edit via the annotation window, an existing document, such as a word processing document, a spreadsheet, drawing, etc. The whiteboard annotation application 202 is typically automatically invoked upon power-up of the IWB appliance 102 and the graphical user interface of IWB appliance 102 includes graphical user interface controls that allow a user to switch between the annotation window and other windows, such as a videoconferencing window. While the whiteboard annotation application 202 is running, a voice command may be detected by the voice recognition processor 106 as discussed above.

Upon generating an audio packet including the recording of the voice command, the voice recognition processor 106 sends the audio packet to an audio packet queue manager 204. The audio packet queue manager 204 may receive audio packets from a plurality of IWB appliances 102 and/or client devices 114. The file queue manager 204 queues the received audio packets in an audio packet queue 206. The audio packet queue 206 may be implemented and managed as a First-In-First-Out (FIFO) queue, but embodiments are not limited to a FIFO queue implementation and other implementations may be used. When a received audio packet reaches the beginning of the FIFO queue, the audio packet queue manager 204 sends the audio packet to the speech-to-text service 112.

In some embodiments, the speech-to-text service 112 is command agnostic and only transcribes the recording using a generic transcription program. In some embodiments, the speech-to-text service is trained using the stored executable commands and stored voice inputs to recognize and transcribe particular commands. Training may help the speech-to-text service 112 to recognize the commands for a specific product or service with better accuracy and fewer errors. Further embodiments may include a feedback mechanism whereby the command processor 108 on the IWB appliance 102 provides feedback associating a specific recording with a specified stored executable command. For example, IWB appliance 102 may provide a visual and/or audible indication to a user that a command spoken by the user has been successfully processed and recognized by IWB appliance 102.

The speech-to-text service 112 sends a command string comprising a transcription of the recording and the metadata to a command string queue manager 208 using metadata included in the audio packet. The command string queue manager 208 queues the received command strings in a command string queue 210. The command string queue 210 may be implemented as a FIFO queue, although other queuing approaches may be used. When a received command string reaches the beginning of the FIFO queue, the command string queue manager 208 identifies an IWB appliance 102 from a plurality of IWB appliances using the metadata included in the command string and sends the command string to the identified IWB appliance 102.

At the IWB appliance 102, the command processor 108 includes voice mode command processing 212 and pen mode command processing 214. The voice mode command processing 212 includes receiving a command string from the command string queue manager 208. The voice mode command processing 212 includes accessing the transcription of the recording and determining whether the transcription matches a stored executable command such as those listed in Table 1. If there is no match, the voice mode command processing 212 may include modifying the transcription by adding or removing characters from the transcription. This may include, for example, determining a stored executable command that best matches the transcription of the recording and then revising the transcription to match the stored executable command. The command processor 108, when it receives the command string, queries a knowledge base (see, e.g. Table 1) for supported commands. If the command string is an exact match, then the IWB appliance 102 executes the command. Otherwise, the IWB appliance 102 parses the command string to approximate a closest match (e.g "Color reed" to "Color Red", "Add Pager" to "Add Page") to match one of the supported commands. Before performing an action on IWB appliance 102, the IWB appliance 102 may provide a message to the user confirming the parsed command string. For example, the message may ask "Do you want to change color to Red [Yes/No]" and, based on user input, the command processor 108 may perform the action on the IWB appliance 102.

The pen mode command processing 214 is configured to, in response to detection of a stylus input from a user, identify an executable command. This may include, for example, detecting selection of one or more graphical user interface controls that correspond to executable commands at the IWB appliance 102.

When an executable command is identified by the voice mode command processing 212 or the pen mode command processing 214, the command processor 108 causes the executable command to be executed by the IWB appliance 102 via an interactive whiteboard application program interface (API) of the IWB appliance 102. IWB appliance For example, in response to a user speaking the command "Start Meeting," IWB appliance 102 may instantiate a videoconferencing window on IWB appliance 102. Commands may also be processed with respect to existing windows, including an annotation window managed by whiteboard annotation application 202.

Figure 3:
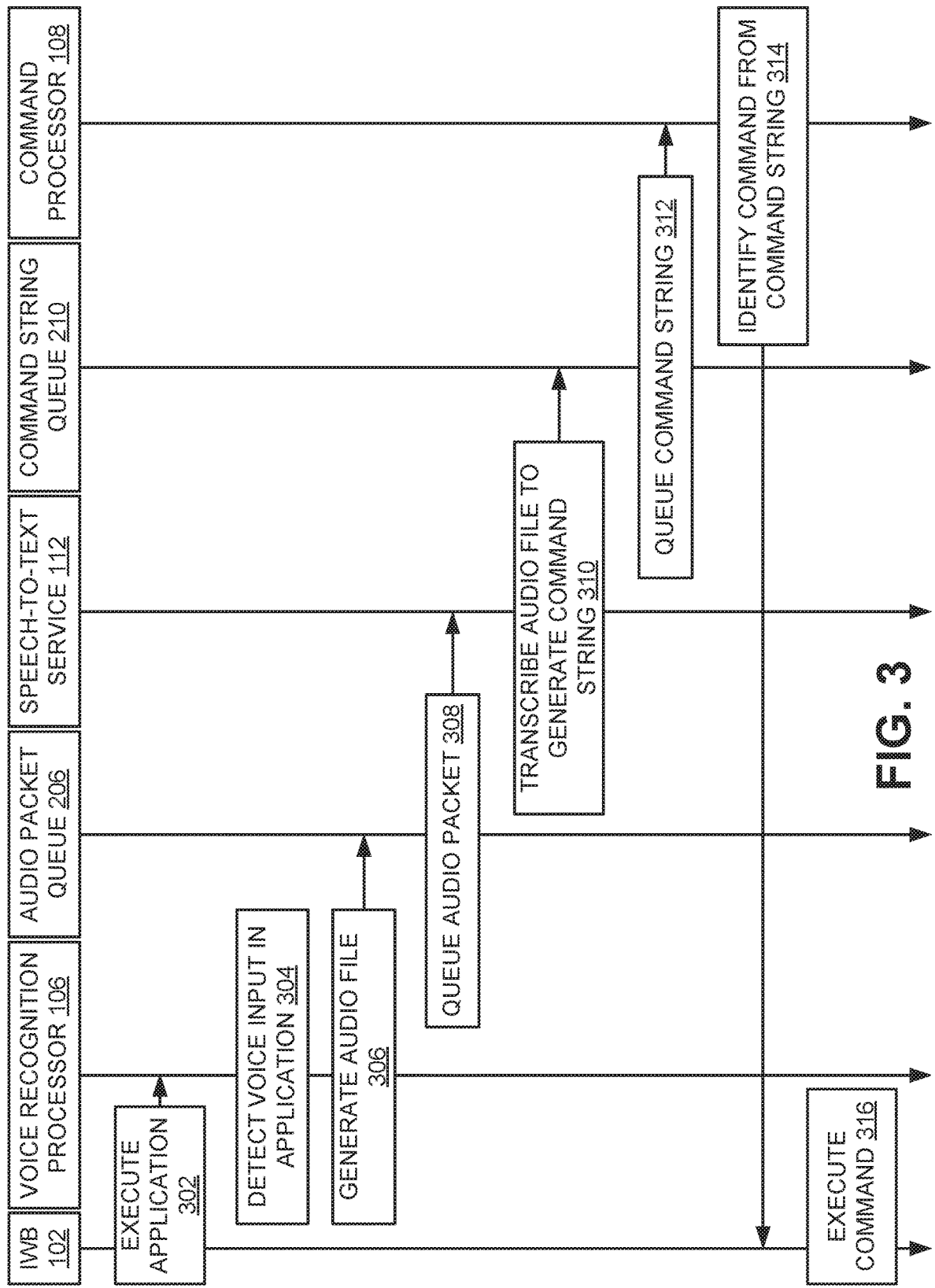
FIG. 3 depicts a multi-lane flowchart of a process for providing voice control of an interactive whiteboard appliance according to some embodiments.

FIG. 3 depicts a multi-lane flowchart of a process for providing voice control of an interactive whiteboard appliance according to some embodiments. The process provides functionality to the IWB appliance 102 for recognizing, identifying, and executing voice commands. Because the IWB appliance 102 executes voice commands, the user may have a hands-free experience with the IWB appliance 102.

In an operation 302, the IWB appliance 102 executes an application on the IWB appliance. Examples of applications can include the annotation application 202, a teleconferencing application, a collaboration application, or a third party application like a cloud storage application.

In an operation 304, the voice recognition processor 106 using sounds captured by a microphone 104, detects a voice input in the executing application. The voice recognition processor 106 may be running in a continuous listening mode or in a start command mode.

In an operation 306, the voice recognition processor 106 generates an audio packet containing the recording and metadata that includes identifiers of the IWB appliance 102 that recorded the recording and an identifier of an IWB appliance that is intended to execute a command identified from the recording. In some instances, these identifiers may identify the same IWB appliance 102 but in other instances these may identify different IWB appliances. The metadata may further include an identifier of audio packet queue manager, and identifier of a speech-to-text service 110, and an identifier of a command string queue manager. The identifiers included in the metadata may include Internet Protocol (IP) addresses and/or Ports associated with each of the entities identified by the metadata. The voice recognition processor 106 sends the generated audio packet to the audio packet queue 206.

Mobile Applications

In alternative embodiments, the operations 302, 304, and 306 may be executed by a client device 114. The client device 114 may be a mobile device of a user or another IWB appliance. The client device 114 may include an application that associates the client device 114 or the interactive whiteboard app 116 on the client device 114 with the IWB appliance 102 that will execute the voice command. In this embodiment, the voice recognition processor 106 on client device 114 performs operations 304 and 306. The audio packet generated on the client device 114 includes metadata that identifies the IWB appliance 102. The voice recognition processor 106 on the client device 114 sends the audio packet to the audio packet queue 206. This allows a user of client device 114 to control either a local IWB appliance or a remote IWB appliance. In a situation where a user of client device 114 selects multiple IWB appliances, then the voice recognition processor 106 on the client device 114 generates and transmits multiple audio packets to the audio packet queue 206. The audio packet may be one packet with metadata that contains a list of IWB appliances 102 where resulting command strings are to be sent. This way the audio packet queue 106 is not burdened with multiple audio packets if the audio packet is intended for multiple IWB appliances 102. The audio packet queue manager 204 may include instructions send the resulting command string to multiple IWB appliances 102 based on metadata included in the audio packet. This allows a user of client device 114 to control multiple IWB appliances via the interactive whiteboard app 116.

In an operation 308, the audio packet queue 206 queues the audio packet in a FIFO queue with other audio packets from the IWB appliance 102 and/or from a plurality of other IWB appliances in electronic communication with the audio packet queue 206. When the audio packet reaches the beginning of the queue, the audio packet queue 206 sends the audio packet to the speech-to-text service 112.

In an operation 310, the speech-to-text service 112 accesses the recording in the audio packet and generates a transcription of the recording. The transcription may be a text field or payload of a command string. The command string is assembled by the speech-to-text service and includes the transcription and the metadata included in the audio packet. Using the metadata in the command string, the speech-to-text service 112 sends the command string to the command string queue 210.

In an operation 312, the command string queue 210 queues the command string in a FIFO queue with other command strings to be sent to the IWB appliance 102 and/or to a plurality of other IWB appliances in electronic communication with the command string queue 210. When the command string reaches the beginning of the queue, the command string queue 210 sends the audio packet to the command processor 108 at the IWB appliance 102.

In an operation 314, the command processor 108 identifies an executable command from a command string. The command processor 108 matches the transcription to a command in a set of stored executable commands. The command processor 108 may modify the transcription and match the modified transcription to a command in a set of stored executable commands. If the command processor 108 is unable to identify an executable command from the transcription, the command processor 108 may drop the command or instruct the IWB appliance 102 to present a prompt to the user asking the user to repeat the voice command. If the user repeats the voice command, the process returns to operation 304. When an executable command is identified, the command processor 108 sends the executable command to the application running on the IWB appliance 102 via the interactive whiteboard API 216.

In an operation 316, the IWB appliance 102 executes the command using the operating system or by sending the command to an application running on the IWB appliance 102. The application may be the application of operation 302 or may be another application.

Figure 4:
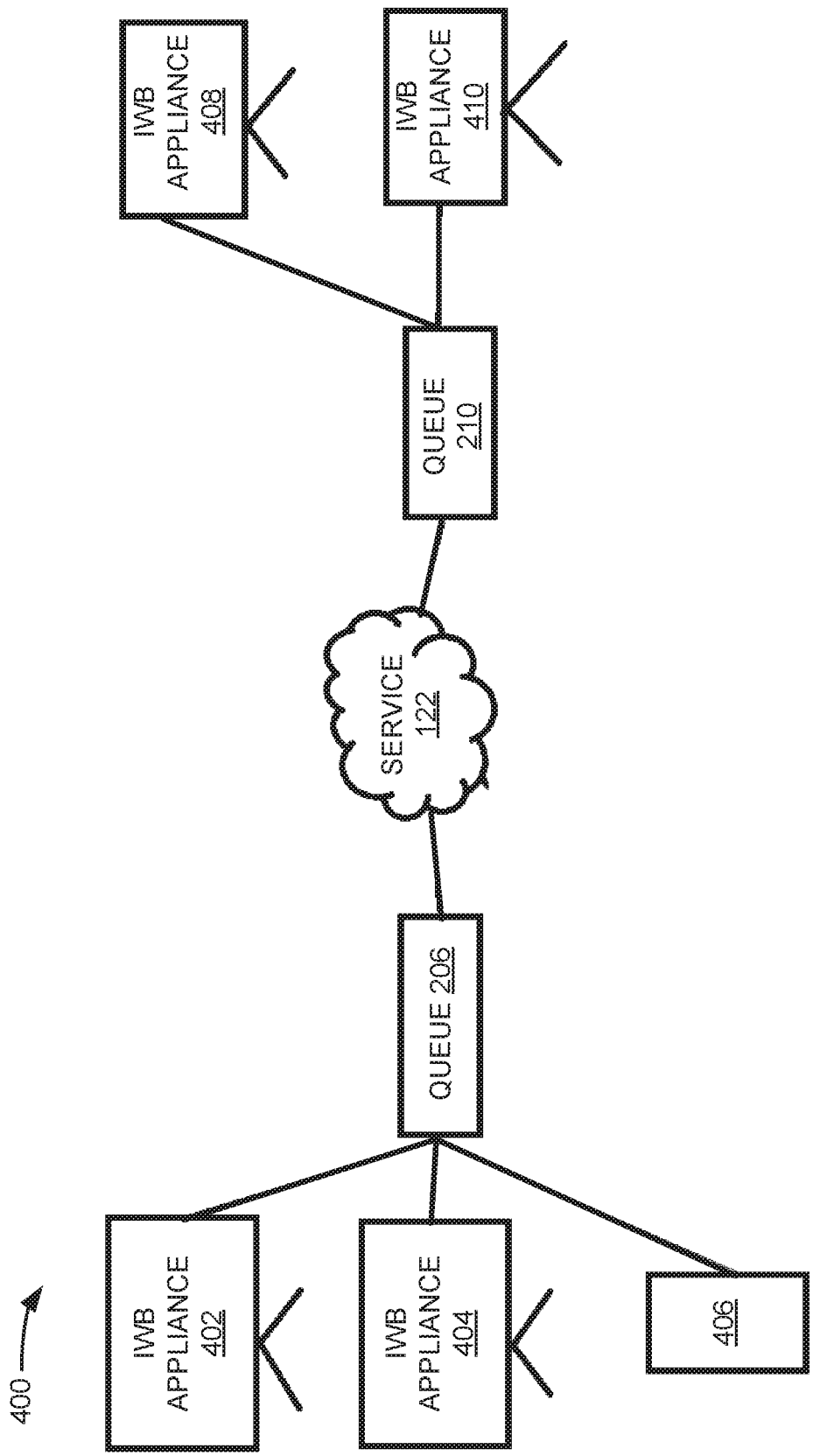
FIG. 4 depicts a further networked environment in which various embodiments may be practiced.

FIG. 4 depicts a further networked environment 400 in which various embodiments may be practiced. The networked environment 400 depicts an example environment where two sites are participating in a teleconference. Each site may have one or more IWB appliances 102, depicted as IWB appliances 402, 404, 408, and 410. Further, participants in the teleconference may have individual mobile devices 406 that, like the client device 114, have an IWB app 116 and voice recognition process 106, as described above. The IWB appliance 402 or mobile device 406, for example, may capture a voice command that is to be executed by the IWB appliance 408 and/or IWB appliance 410, or, in further embodiments, also by IWB appliance 402 and IWB appliance 404.

In FIG. 4, IWB appliances 402, 404 and mobile device 406 generate an audio packet from a voice input captured via, for example a microphone 104, using a voice recognition processor 106. The IWB appliances 402, 404 and mobile device 406 associate the audio packet with IWB appliances 408 and/or 410 using, for example, an interactive whiteboard app 116. The queued audio packets are sent to speech-to-text service 122. The resulting command strings are queued in command string queue 210. The command string queue 210 accesses metadata associated with the command string and, from the metadata, determines that the command string be sent to the IWB appliance 408 and/or the IWB appliance 410. Based on the determination, the command string is sent to the IWB appliance 408 and/or the IWB appliance 410.

Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
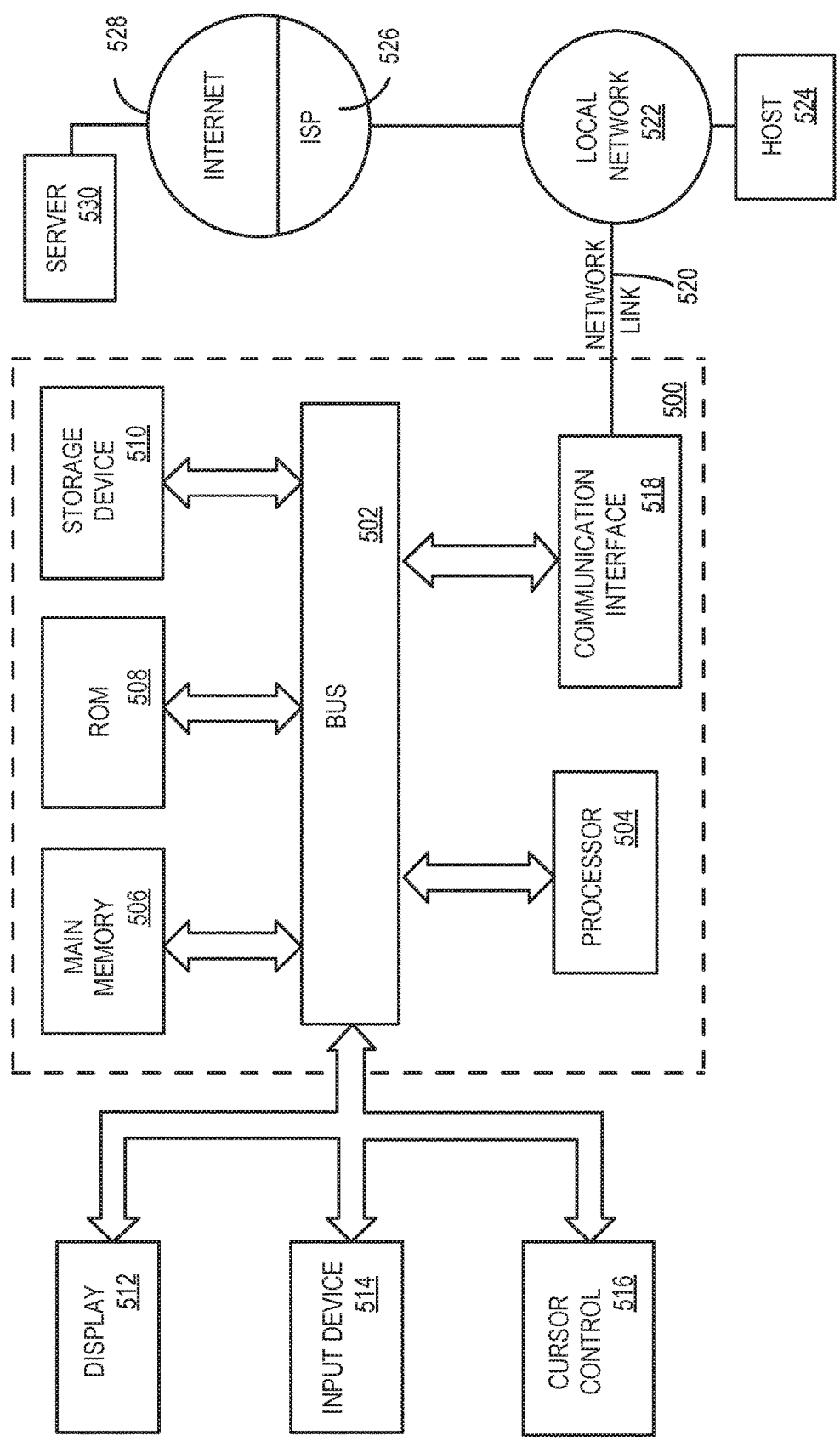
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A mobile device comprising:
one or more processors;
an Interactive Whiteboard (IWB) application stored at the mobile device configured with user interface controls that allow a user of the mobile device to remotely control an IWB appliance from the mobile device; and
a voice recognition processor configured to:
capture a voice input received from the user of the mobile device and generate an audio packet that includes a recording of the voice input received from the user of the mobile device;
cause the audio packet and data that identifies the IWB appliance to be transmitted to a speech-to-text service that is physically separate from the IWB appliance;
wherein the speech-to-text service generates and provides, to the IWB appliance, using the data received from the mobile device that identifies the IWB appliance, a command string comprising a transcription of the recording of the voice input;
wherein the IWB appliance:
identifies, from the command string that comprises the transcription of the recording of the voice input, an executable command that is executable by the IWB appliance by comparing the transcription of the recording of the voice input to one or more pre-determined executable commands to identify a match between the transcription of the recording of the voice input and the one or more pre-determined executable commands, causes an application of the IWB appliance to execute the executable command.

2. The mobile device of claim 1, wherein causing the audio packet and data that identifies the IWB appliance to be transmitted to the speech-to-text service that is physically separate from the IWB appliance includes transmitting the audio packet and data to an audio packet queue managed by an audio packet queue manager.

3. The mobile device of claim 1, wherein the data that that identifies the IWB appliance is included in metadata of the audio packet.

4. The mobile device of claim 1, wherein:
causing the audio packet and data that identifies the IWB appliance to be transmitted to the speech-to-text service that is physically separate from the IWB appliance includes causing the audio packet, data that identifies the IWB appliance, and second data that identifies a second IWB appliance that is different than the IWB appliance, to be transmitted to the speech-to-text service that is physically separate from the IWB appliance; and
wherein the speech-to-text service generates and provides, to both the IWB appliance using the data received from the mobile device that identifies the IWB appliance and to the second IWB appliance using the second data that identifies the second IWB appliance, the command string comprising the transcription of the recording of the voice input.

5. The mobile device of claim 4, wherein causing the audio packet, the data that identifies the IWB appliance, and the second data that identifies the second IWB appliance that is different than the IWB appliance, to be transmitted to the speech-to-text service that is physically separate from the IWB appliance includes transmitting the audio packet, the data that identifies the IWB appliance, and the second data that identifies the second IWB appliance that is different than the IWB appliance, to an audio packet queue managed by an audio packet queue manager that forwards the audio packet to the speech-to-text service.

6. The mobile device of claim 5, wherein both the data that that identifies the IWB appliance and the second data that identifies the second IWB appliance that is different than the IWB appliance are included in metadata of the audio packet.

7. The mobile device of claim 6, wherein both the data that that identifies the IWB appliance and the second data that identifies the second IWB appliance that is different than the IWB appliance are included in metadata of the audio packet.

8. The mobile device of claim 4, wherein the voice recognition processor causes the audio packet, the data that identifies the IWB appliance, and the second data that identifies the second IWB appliance that is different than the IWB appliance, to be transmitted to the speech-to-text service in response to the user selecting both the IWB appliance and the second IWB appliance via the IWB application on the mobile device.

9. One or more non-transitory computer-readable media storing instructions which, when processed by one or more processors, cause:
capturing, by a voice recognition processor of a mobile device, a voice input received from a user of the mobile device and generate an audio packet that includes a recording of the voice input received from the user of the mobile device, wherein an Interactive Whiteboard (IWB) application stored at the mobile device is configured with user interface controls that allow the user of the mobile device to remotely control an IWB appliance from the mobile device;
causing, by the voice recognition processor of the mobile device, the audio packet and data that identifies the IWB appliance to be transmitted to a speech-to-text service that is physically separate from the IWB appliance;
wherein the speech-to-text service generates and provides, to the IWB appliance, using the data received from the mobile device that identifies the IWB appliance, a command string comprising a transcription of the recording of the voice input;
wherein the IWB appliance:
identifies, from the command string that comprises the transcription of the recording of the voice input, an executable command that is executable by the IWB appliance by comparing the transcription of the recording of the voice input to one or more pre-determined executable commands to identify a match between the transcription of the recording of the voice input and the one or more pre-determined executable commands, causes an application of the IWB appliance to execute the executable command.

10. The one or more non-transitory computer-readable media of claim 9, wherein causing the audio packet and data that identifies the IWB appliance to be transmitted to the speech-to-text service that is physically separate from the IWB appliance includes transmitting the audio packet and data to an audio packet queue managed by an audio packet queue manager.

11. The one or more non-transitory computer-readable media of claim 9, wherein the data that that identifies the IWB appliance is included in metadata of the audio packet.

12. The one or more non-transitory computer-readable media of claim 9, wherein:
causing the audio packet and data that identifies the IWB appliance to be transmitted to the speech-to-text service that is physically separate from the IWB appliance includes causing the audio packet, data that identifies the IWB appliance, and second data that identifies a second IWB appliance that is different than the IWB appliance, to be transmitted to the speech-to-text service that is physically separate from the IWB appliance; and
wherein the speech-to-text service generates and provides, to both the IWB appliance using the data received from the mobile device that identifies the IWB appliance and to the second IWB appliance using the second data that identifies the second IWB appliance, the command string comprising the transcription of the recording of the voice input.

13. The one or more non-transitory computer-readable media of claim 12, wherein causing the audio packet, the data that identifies the IWB appliance, and the second data that identifies the second IWB appliance that is different than the IWB appliance, to be transmitted to the speech-to-text service that is physically separate from the IWB appliance includes transmitting the audio packet, the data that identifies the IWB appliance, and the second data that identifies the second IWB appliance that is different than the IWB appliance, to an audio packet queue managed by an audio packet queue manager that forwards the audio packet to the speech-to-text service.

14. The one or more non-transitory computer-readable media of claim 13, wherein both the data that that identifies the IWB appliance and the second data that identifies the second IWB appliance that is different than the IWB appliance are included in metadata of the audio packet.

15. The one or more non-transitory computer-readable media of claim 14, wherein both the data that that identifies the IWB appliance and the second data that identifies the second IWB appliance that is different than the IWB appliance are included in metadata of the audio packet.

16. The one or more non-transitory computer-readable media of claim 12, wherein the voice recognition processor causes the audio packet, the data that identifies the IWB appliance, and the second data that identifies the second IWB appliance that is different than the IWB appliance, to be transmitted to the speech-to-text service in response to the user selecting both the IWB appliance and the second IWB appliance via the IWB application on the mobile device.

17. A computer-implemented method comprising:
  capturing, by a voice recognition processor of a mobile device, a voice input received from a user of the mobile device and generate an audio packet that includes a recording of the voice input received from the user of the mobile device, wherein an Interactive Whiteboard (IWB) application stored at the mobile device is configured with user interface controls that allow the user of the mobile device to remotely control an IWB appliance from the mobile device;
  causing, by the voice recognition processor of the mobile device, the audio packet and data that identifies the IWB appliance to be transmitted to a speech-to-text service that is physically separate from the IWB appliance;
  wherein the speech-to-text service generates and provides, to the IWB appliance, using the data received from the mobile device that identifies the IWB appliance, a command string comprising a transcription of the recording of the voice input;
  wherein the IWB appliance;
    identifies, from the command string that comprises the transcription of the recording of the voice input, an executable command that is executable by the IWB appliance by comparing the transcription of the recording of the voice input to one or more pre-determined executable commands to identify a match between the transcription of the recording of the voice input and the one or more pre-determined executable commands,
    causes an application of the IWB appliance to execute the executable command.

18. The computer-implemented method of claim 17, wherein causing the audio packet and data that identifies the IWB appliance to be transmitted to the speech-to-text service that is physically separate from the IWB appliance includes transmitting the audio packet and data to an audio packet queue managed by an audio packet queue manager.

19. The computer-implemented method of claim 17, wherein the data that that identifies the IWB appliance is included in metadata of the audio packet.

20. The computer-implemented method of claim 17, wherein:
  causing the audio packet and data that identifies the IWB appliance to be transmitted to the speech-to-text service that is physically separate from the IWB appliance includes causing the audio packet, data that identifies the IWB appliance, and second data that identifies a second IWB appliance that is different than the IWB appliance, to be transmitted to the speech-to-text service that is physically separate from the IWB appliance; and
  wherein the speech-to-text service generates and provides, to both the IWB appliance using the data received from the mobile device that identifies the IWB appliance and to the second IWB appliance using the second data that identifies the second IWB appliance, the command string comprising the transcription of the recording of the voice input.

* * * * *